(12) United States Patent
Chan et al.

(10) Patent No.: US 12,027,977 B2
(45) Date of Patent: Jul. 2, 2024

(54) VOLTAGE REGULATOR USING FEEDBACK LOOP CIRCUIT FOR ACCURATELY REGULATING OUTPUT VOLTAGE WHEN INTEGRATION OF ERROR VOLTAGE IS ON HOLD

(71) Applicant: MediaTek Singapore Pte. Ltd., Singapore (SG)

(72) Inventors: Man Pun Chan, San Jose, CA (US); Hao-Ping Hong, San Jose, CA (US); Yung-Chih Yen, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 268 days.

(21) Appl. No.: 17/718,332

(22) Filed: Apr. 12, 2022

(65) Prior Publication Data

US 2022/0337159 A1 Oct. 20, 2022

Related U.S. Application Data

(60) Provisional application No. 63/176,381, filed on Apr. 19, 2021, provisional application No. 63/176,380, filed on Apr. 19, 2021.

(51) Int. Cl.
*H02M 3/158* (2006.01)
*H02M 1/00* (2006.01)

(52) U.S. Cl.
CPC ......... *H02M 3/158* (2013.01); *H02M 1/0003* (2021.05)

(58) Field of Classification Search
CPC .................. H02M 3/156–158; H02M 1/0003

USPC ......................................................... 323/271
See application file for complete search history.

(56) References Cited

U.S. PATENT DOCUMENTS

| | | | |
|---|---|---|---|
| 7,324,361 B2 | 1/2008 | Siri | |
| 8,629,666 B2 | 1/2014 | Carroll | |
| 10,425,006 B2 | 9/2019 | Babazadeh | |
| 10,511,234 B2 | 12/2019 | Zhang | |
| 2006/0043955 A1* | 3/2006 | Hung | H02M 3/158 323/283 |
| 2007/0133234 A1 | 6/2007 | Huynh | |
| 2008/0024100 A1* | 1/2008 | Huang | H02M 3/158 323/282 |
| 2012/0194258 A1* | 8/2012 | Nien | H02M 3/1588 327/512 |

FOREIGN PATENT DOCUMENTS

| | | |
|---|---|---|
| CN | 101931326 A | 12/2010 |
| CN | 102403887 A | 4/2012 |
| CN | 102624255 A | 8/2012 |

(Continued)

*Primary Examiner* — Yemane Mehari
(74) *Attorney, Agent, or Firm* — Winston Hsu

(57) ABSTRACT

A feedback loop circuit of a voltage regulator includes a voltage extraction circuit and a loop filter circuit. The voltage extraction circuit receives an error voltage signal that is indicative of difference between an output voltage signal and a reference voltage of the voltage regulator, and generates a voltage extraction signal by extracting one representative voltage for one switching cycle of the voltage regulator according to the error voltage signal. The loop filter circuit applies filtering to the voltage extraction signal to set a feedback signal, and output the feedback signal to a controller circuit of the voltage regulator for regulating the output voltage signal.

20 Claims, 7 Drawing Sheets

(56) References Cited

FOREIGN PATENT DOCUMENTS

| CN | 102684491 A | 9/2012 | | |
|---|---|---|---|---|
| CN | 107728764 A | 2/2018 | | |
| KR | 10-2007-0081109 A | 8/2007 | | |
| TW | 1521836 B | 2/2016 | | |
| TW | 201722044 A | 6/2017 | | |
| WO | WO-2017032420 A1 * | 3/2017 | .............. | H02M 1/08 |

* cited by examiner

VOLTAGE REGULATOR USING FEEDBACK LOOP CIRCUIT FOR ACCURATELY REGULATING OUTPUT VOLTAGE WHEN INTEGRATION OF ERROR VOLTAGE IS ON HOLD

CROSS REFERENCE TO RELATED APPLICATIONS

This application claims the benefit of U.S. Provisional Application No. 63/176,380 and U.S. Provisional Application No. 63/176,381, both filed on Apr. 19, 2021. The whole contents of the applications are incorporated herein by reference.

BACKGROUND

The present invention relates to a voltage regulator design, and more particularly, to a voltage regulator using a feedback loop circuit for accurately regulating an output voltage when integration of an error voltage is on hold.

In an electronic device, a voltage regulator is used to supply stable power to electronic loads. The voltage regulator is typically designed to maintain an output voltage within specified limits. However, when the voltage regulator operates under a discontinuous conduction mode (DCM), it is possible that the output voltage may drop significantly when load transient happens. Thus, there is a need for an innovative voltage regulator design which is capable of compensating for inaccuracy of the output voltage without compromising the load transient response.

SUMMARY

One of the objectives of the claimed invention is to provide a voltage regulator using a feedback loop circuit for accurately regulating an output voltage when integration of an error voltage is on hold.

According to a first aspect of the present invention, an exemplary feedback loop circuit of a voltage regulator is disclosed. The exemplary feedback loop circuit includes a voltage extraction circuit and a loop filter circuit. The voltage extraction circuit is arranged to receive an error voltage signal that is indicative of difference between an output voltage signal and a reference voltage of the voltage regulator, and generate a voltage extraction signal by extracting one representative voltage for one switching cycle of the voltage regulator according to the error voltage signal. The loop filter circuit is arranged to apply filtering to the voltage extraction signal to set a feedback signal, and output the feedback signal to a controller circuit of the voltage regulator for regulating the output voltage signal.

According to a second aspect of the present invention, an exemplary controller circuit of a voltage regulator is disclosed. The exemplary controller circuit includes a filter circuit and a hold decision maker circuit. The filter circuit is arranged to receive an input signal, and perform integration of the input signal to set a filter output signal, wherein the input signal is derived from an error voltage signal that is indicative of difference between an output voltage signal and a reference voltage of the voltage regulator, and the filter output signal is used for pulse-width modulation (PWM) control of the voltage regulator. The hold decision maker circuit is arranged to check a plurality of parameters to make a hold decision for instructing the filter circuit to temporarily hold the integration of the input signal.

According to a third aspect of the present invention, an exemplary voltage regulator is disclosed. The exemplary voltage regulator includes a controller circuit and a feedback loop circuit. The controller circuit includes a filter circuit and a hold decision maker circuit. The filter circuit is arranged to receive an input signal, and perform integration of the input signal to set a filter output signal, wherein the input signal is derived from an error voltage signal that is indicative of difference between an output voltage signal and a reference voltage of the voltage regulator, and the filter output signal is used for pulse-width modulation (PWM) control of the voltage regulator. The hold decision maker circuit is arranged to generate a first control signal and a second control signal. The feedback loop circuit is arranged to receive the error voltage signal, and generate a feedback signal according to the error voltage signal. In response to the first control signal with a first setting, the controller circuit temporarily holds the integration of the input signal. In response to the second control signal with a second setting, the feedback loop circuit generates and outputs the feedback signal to the controller circuit for regulating the output voltage signal during a period in which the controller circuit temporarily holds the integration of the input signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names.

This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
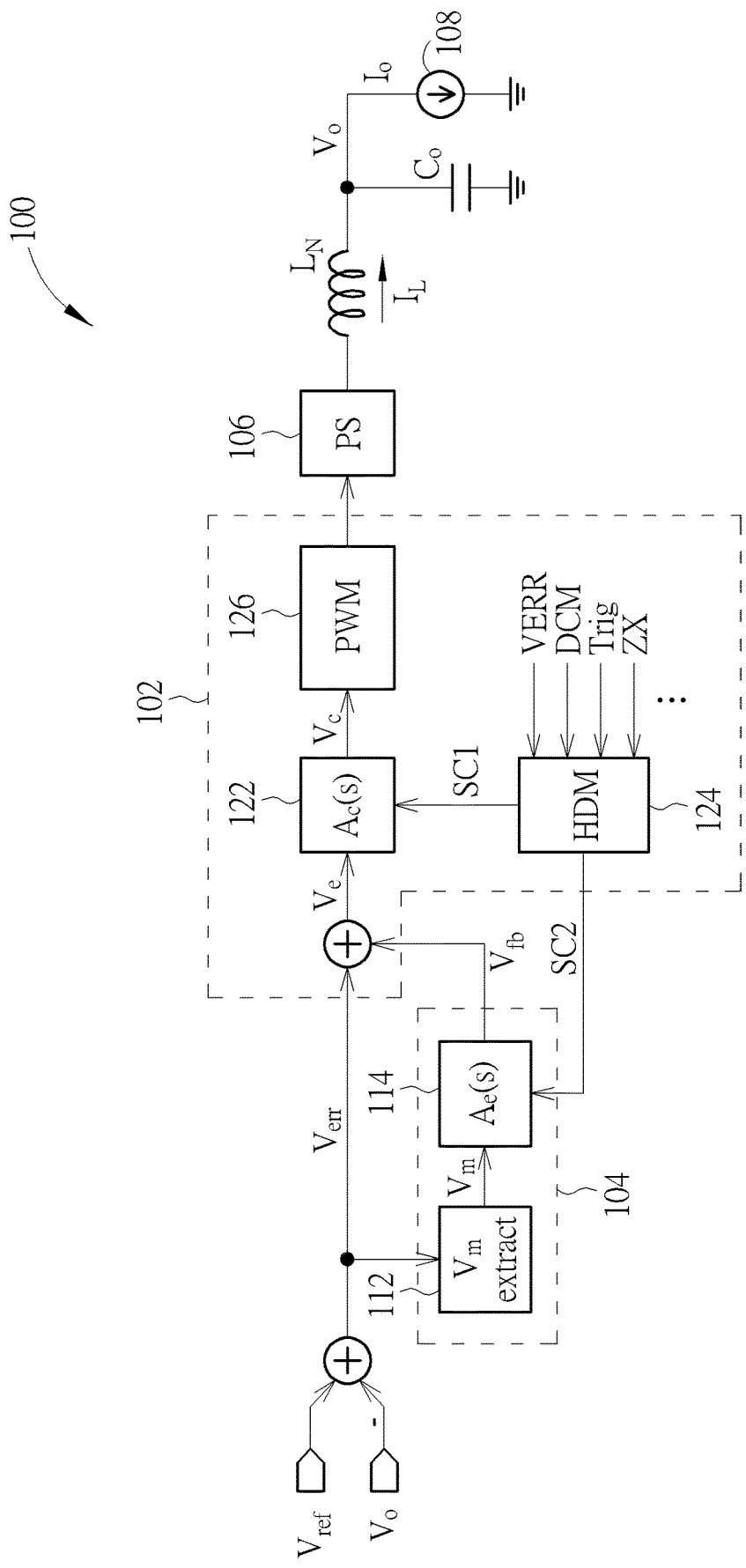
FIG. 1 is a diagram illustrating a first voltage regulator according to an embodiment of the present invention.

FIG. 1 is a diagram illustrating a first voltage regulator according to an embodiment of the present invention. The voltage regulator 100 may be a switching voltage regulator that is capable of regulating the output voltage signal $V_o$ delivered to the load 108 according to a discontinuous conduction mode (DCM) operation. It should be noted that the load current $I_o$ supplied to the load 108 may vary in response to different load conditions of the load 108. As shown in FIG. 1, the voltage regulator 100 may include a controller circuit 102, a feedback loop circuit 104, a power stage circuit (labeled as "PS") 106, an inductor $L_N$, and an output capacitor $C_o$. The feedback loop circuit 104 includes a voltage extraction circuit (labeled as "$V_m$ extract") 112 and a loop filter circuit (labeled as "$A_e(s)$"). The controller circuit 102 includes a filter circuit (labeled as "$A_c(s)$") 122 (e.g. a filter with an integration function) 122, a hold decision maker circuit (labeled as "HDM") 124, and a pulse-width modulation (PWM) signal generator circuit (labeled by "PWM") 126. The controller circuit 102 is a part of an output voltage feedback loop. In this embodiment, an input signal $V_e$ of the filter circuit 122 is derived from an error voltage signal $V_{err}$ that is indicative of difference between an output voltage signal $V_o$ and a reference voltage $V_{ref}$ of the voltage regulator 100, and a control voltage signal $V_c$ fed into the PWM signal generator circuit 126 is derived from an output signal of the filter circuit 122. The PWM signal generator circuit 126 is arranged to deal with PWM control of the power stage circuit 106. Hence, the PWM signal generator circuit 126 can regulate the output voltage signal $V_o$ delivered to the load 108 by controlling PWM pulses applied to the power stage circuit 106. For example, the power stage circuit 106 may include a high-side switch and a low-side switch controlled by PWM pulses generated from the PWM signal generator circuit 126. Generally speaking, when the reference voltage $V_{ref}$ is set, the PWM signal generator circuit 126 controls the power stage circuit 106 in response to difference between the output voltage signal $V_o$ and reference voltage $V_{ref}$. In other words, the output voltage signal $V_o$ is regulated by a negative feedback loop using the error voltage signal $V_{err}$.

Figure 2:
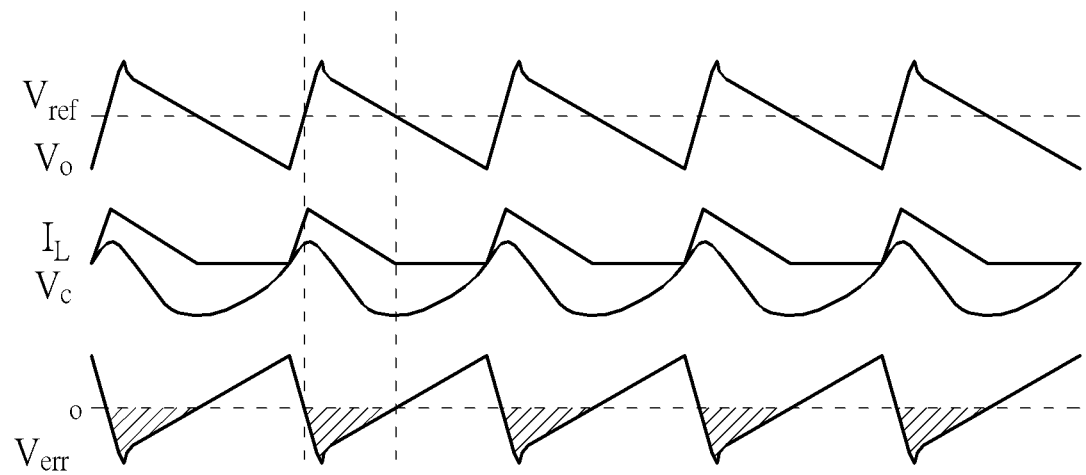
FIG. 2 is a waveform diagram of different signals in the voltage regulator shown in FIG. 1 under a condition that the feedback loop circuit and the hold decision maker circuit are both disabled and load transient does not happen.

FIG. 2 is a waveform diagram of different signals in the voltage regulator 100 under a condition that the feedback loop circuit 104 and the hold decision maker circuit 124 are both disabled and load transient does not happen. Suppose that the voltage regulator 100 is operating under DCM. The accuracy of the output voltage signal $V_o$ in relative to the reference voltage $V_{ref}$ depends on integration of the error voltage signal $V_{err}$ ($V_{err}=V_{ref}-V_o$) in the output voltage negative feedback loop regulation. The control voltage signal $V_c$ depends on integration of the error voltage signal $V_{err}$. In addition, triggering of PWM pulse happens each time the control voltage signal $V_c$ crosses over the inductor current $I_L$. Hence, the output voltage negative feedback loop regulation will enforce $V_{err}=0$ in average (i.e. $V_o=V_{ref}$ in average). Because of integration of the error voltage signal $V_{err}$, the control voltage signal $V_c$ becomes deeper when the negative region (as indicated by shaded areas) of the error voltage signal $V_{err}$ has a larger area.

Figure 3:
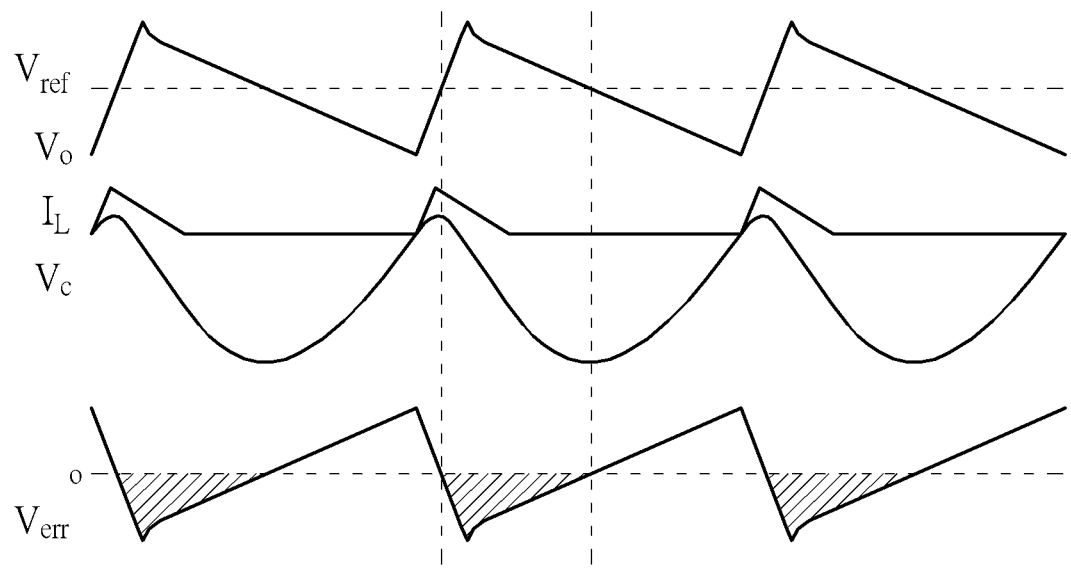
FIG. 3 is a waveform diagram of different signals in the voltage regulator shown in FIG. 1 under a condition that the feedback loop circuit and the hold decision maker circuit are both disabled, load transient does not happen, and the load current has a smaller current value.

FIG. 3 is a waveform diagram of different signals in the voltage regulator 100 under a condition that the feedback loop circuit 104 and the hold decision maker circuit 124 are both disabled, load transient does not happen, and the load current $I_o$ has a smaller current value. When the load current $I_o$ has a smaller current value, the negative region (as indicated by shaded areas) of the error voltage signal $V_{err}$ will be larger. Hence, compared to the control voltage signal $V_c$ shown in FIG. 2, the control voltage signal $V_c$ shown in FIG. 3 becomes deeper due to the fact that the period of the error voltage signal $V_{err}$ is longer.

Figure 4:
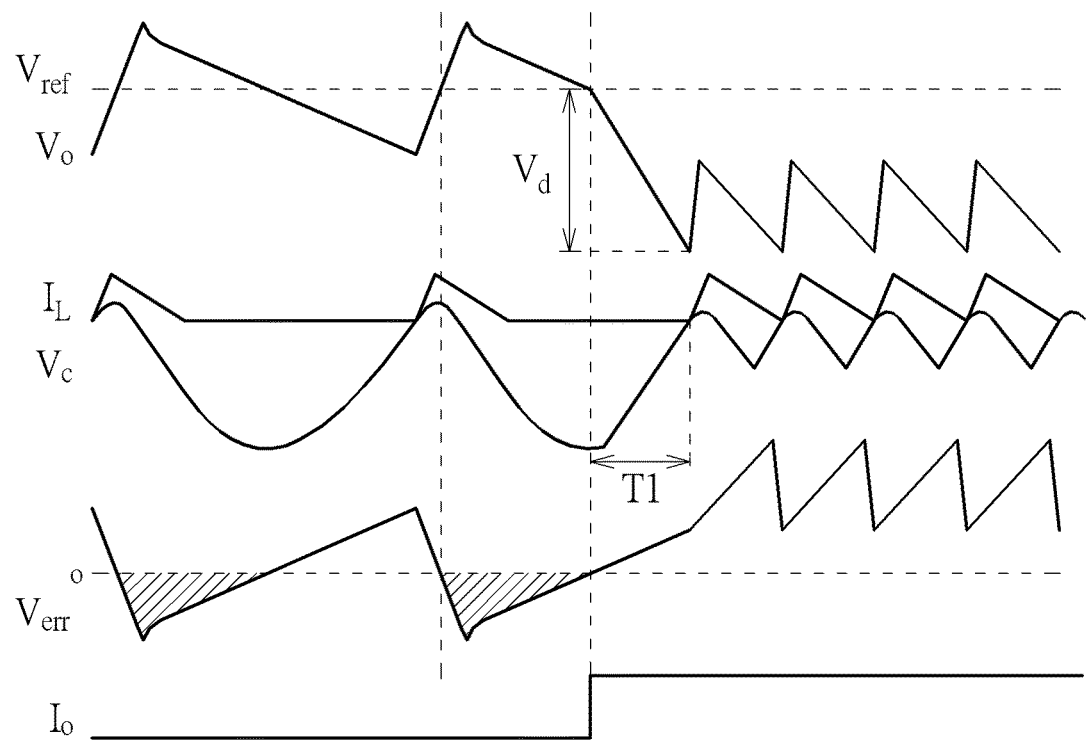
FIG. 4 is a waveform diagram of different signals in the voltage regulator shown in FIG. 1 under a condition that the feedback loop circuit and the hold decision maker circuit are both disabled and load transient happens.

The problem of a control voltage signal $V_c$ having a deep negative voltage is that the output voltage signal $V_o$ will drop significantly if load transient happens in the valley of the control voltage signal $V_c$. FIG. 4 is a waveform diagram of different signals in the voltage regulator 100 under a condition that the feedback loop circuit 104 and the hold decision maker circuit 124 are both disabled and load transient happens. Since the load current $I_o$ has sudden fluctuation at the time the control voltage signal $V_c$ is at a valley point, it takes time T1 for the control voltage signal $V_c$ to cross over the inductor current $I_L$ and trigger the PWM pulse, which results in a voltage drop $V_d$ of the output voltage signal $V_o$.

To address the above issue, the hold decision maker circuit 124 can be enabled to make a hold decision for instructing the filter circuit 122 to temporarily hold integration of the input signal $V_e$. The voltage level of the control voltage signal $V_c$ is decreased when the error voltage signal $V_{err}$ is in the negative region, and is increased when the error voltage signal $V_{err}$ is in the positive region. One means of preventing the control voltage signal $V_c$ from having a deep negative voltage is temporarily holding integration of the input signal $V_e$ during a period in which the error voltage signal $V_{err}$ is in the negative region.

Figure 5:
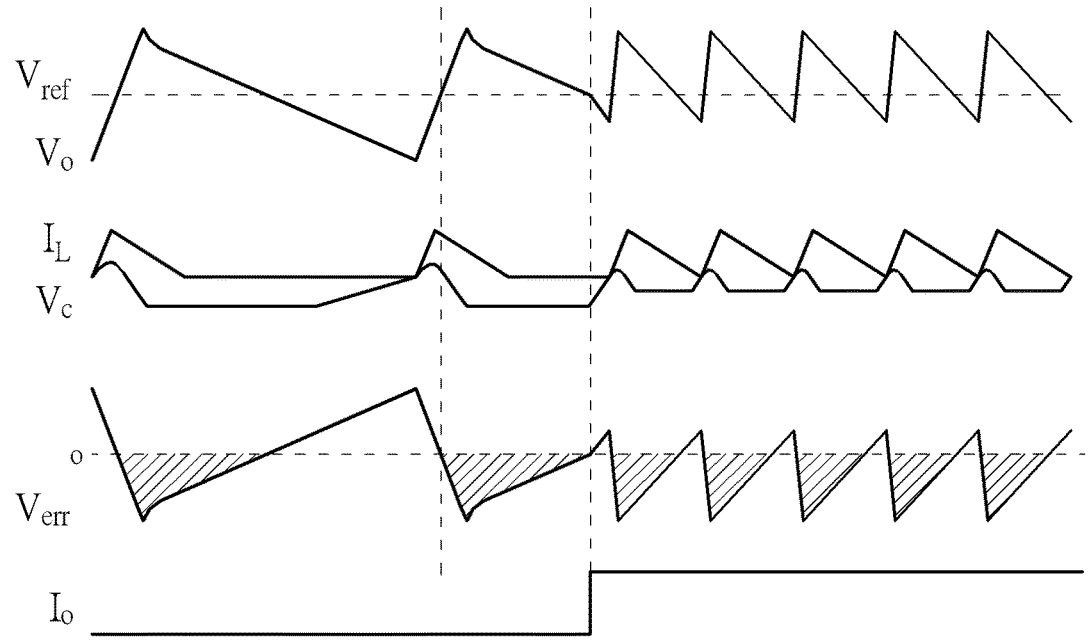
FIG. 5 is a waveform diagram of different signals in the voltage regulator shown in FIG. 1 under a condition that the feedback loop circuit is disabled, the hold decision maker circuit 124 is enabled, and load transient happens.

FIG. 5 is a waveform diagram of different signals in the voltage regulator 100 under a condition that the feedback loop circuit 104 is disabled, the hold decision maker circuit 124 is enabled, and load transient happens. In this example, the hold decision maker circuit 124 can instruct the filter circuit 122 to temporarily hold the integration of the input signal $V_e$ during a period in which the error voltage signal $V_{err}$ is in the negative region (as indicated by shaded areas). As can be seen from FIG. 5, the control voltage signal $V_c$ does not change in response to integration of the input signal $V_e$ when the error voltage signal $V_{err}$ is in the negative region. Compared to the control voltage signal $V_c$ shown in FIG. 4, the control voltage signal $V_c$ shown in FIG. 5 is shallower. Since the control voltage signal $V_c$ is shallower, the load transient response can be faster regardless of when sudden change of the load current $I_o$ happens. However, since integration of the input signal $V_e$ is on hold, the instant deviation of the regulator output voltage is not reflected in the control voltage signal $V_c$. There is trade-off between load transient response and output voltage accuracy. The load transient response can be improved by temporarily holding integration of the input signal $V_e$. The accuracy of the output voltage signal $V_o$ is compromised, however.

To address the above issue, the present invention proposes using the feedback loop circuit 104 to generate a feedback signal $V_{fb}$ according to the error voltage signal $V_{err}$, and output the feedback signal $V_{fb}$ to the controller circuit 102 for regulating the output voltage signal $V_o$. For example, the feedback signal $V_{fb}$ is generated and output to the controller circuit 102 during a period in which the controller circuit 102 temporarily holds integration of the input signal $V_e$ at the filter circuit 122. In this way, the voltage regulator 100 can have compensation for inaccuracy of the output voltage without compromising the load transient response. The principles of feedback loop circuit 104 and hold decision maker circuit 124 are explained in detail as below with reference to the accompanying drawings.

In this embodiment, the voltage extraction circuit 112 is arranged to generate a voltage extraction signal $V_m$ by extracting one representative voltage for each switching DCM cycle of the voltage regulator 100 according to the error voltage signal $V_{err}$, and the loop filter circuit 114 is arranged to apply filtering to the voltage extraction signal $V_m$ to set a feedback signal $V_{fb}$, and output the feedback signal $V_{fb}$ to the controller circuit 102 for regulating the output voltage signal $V_o$.

As illustrated in FIG. 2 and FIG. 3, when an average of the output voltage signal $V_o$ is equal to the reference voltage $V_{ref}$ (i.e. $V_o = V_{ref}$ in average), the area of the negative region of the error voltage signal $V_{err}$ is equal to the area of the positive region of the error voltage signal $V_{err}$ during each switching DCM cycle of the voltage regulator. Each switching DCM cycle of the voltage regulator starts at a time point that the control voltage signal $V_c$ crosses over the inductor current $I_L$, and ends at a time point that the control voltage signal $V_c$ crosses over the inductor current $I_L$ again. Hence, when an average of the output voltage signal $V_o$ is equal to the reference voltage $V_{ref}$ (i.e. $V_o = V_{ref}$ in average), a middle point voltage $V_m$ between a peak voltage $V_p$ and a valley voltage $V_n$ of the error voltage signal $V_{err}$ during one switching DCM cycle of the voltage regulator should be equal to 0V. If the middle point voltage $V_m$ is not equal to 0V, it implies that an average of the output voltage signal $V_o$ is deviated from the reference voltage $V_{ref}$.

Based on above observations, the present invention proposes using the feedback loop circuit 104 to sample a peak voltage $V_p$ and a valley voltage $V_n$ of the error voltage signal $V_{err}$ during each switching DCM cycle of the voltage regulator, and refer to the peak voltage $V_p$ and the valley voltage $V_n$ to determine one representative voltage (e.g. $V_m = V_p + V_n$) for each switching DCM cycle of the voltage regulator 100. By way of example, but not limitation, the voltage extraction circuit 112 may sample the peak voltage $V_p$ when triggering of PWM pulse happens (i.e. control voltage signal $V_c$ crosses over inductor current $I_L$), and may sample the valley voltage $V_n$ after zero current crossing of inductor current $I_L$ happens.

Figure 6:
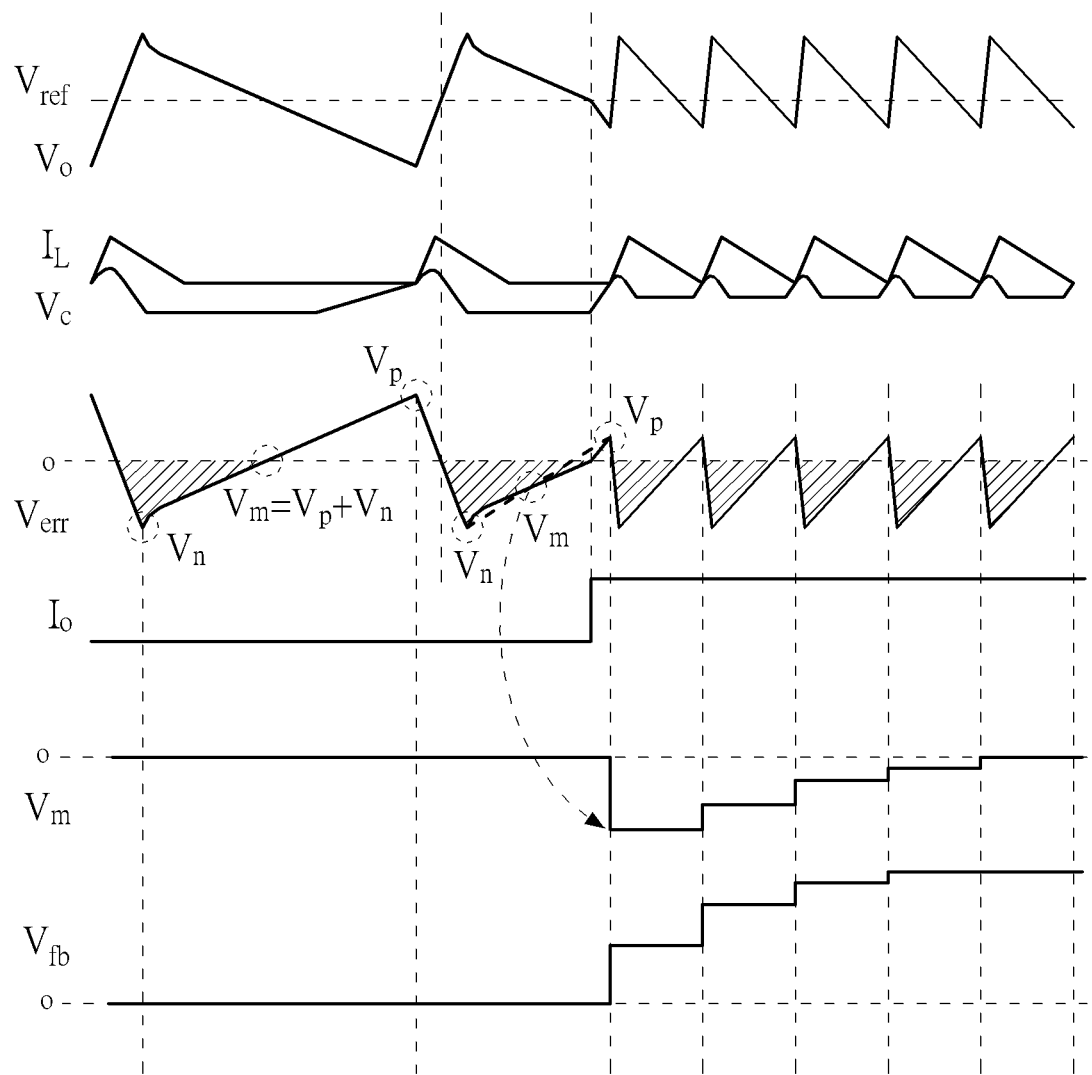
FIG. 6 is a waveform diagram of different signals in the voltage regulator shown in FIG. 1 under a condition that the feedback loop circuit and the hold decision maker circuit are both enabled and load transient happens.

Please refer to FIG. 1 in conjunction with FIG. 6. FIG. 6 is a waveform diagram of different signals in the voltage regulator 100 under a condition that the feedback loop circuit 104 and the hold decision maker circuit 124 are both enabled and load transient happens. When the peak voltage $V_p$ is sampled for a current switching DCM cycle, the peak voltage $V_p$ and the valley voltage $V_n$ sampled for the same switching DCM cycle are used to calculate the middle point voltage $V_m$ that is referenced for regulating the voltage output signal $V_o$ in the next switching DCM cycle. The feedback signal $V_{fb}$ is set on the basis of the voltage extraction signal $V_m$. Though the filter circuit 122 is instructed to temporarily hold integration of the input signal $V_e$ (which is derived from the error voltage signal $V_{err}$), the feedback signal $V_{fb}$ injected to the controller circuit 102 can force the output voltage feedback loop to offset the output voltage signal $V_o$ such that the voltage extraction signal $V_m$ will be equal to 0V in a steady state.

The feedback signal $V_{fb}$ may be a voltage signal or a current signal. In addition, the polarity of the feedback signal $V_{fb}$ injected to the controller circuit 102 depends on the controller architecture or implementation. That is, when the voltage extraction signal $V_m$ has a non-zero value, the feedback signal $V_{fb}$ may be set by a positive value or a negative value, depending on the controller architecture or implementation. Furthermore, the speed of the regulation depends on the design of the loop filter 114.

The feedback loop circuit 104 generates and outputs the feedback signal $V_{fb}$ to the controller circuit 102 for regulating the output voltage signal $V_o$ during a period in which the controller circuit 102 (particularly, filter circuit 122) temporarily holds integration of the input signal $V_e$. The input signal $V_e$ of the filter circuit 122 is derived from the error voltage signal $V_{err}$. In this embodiment, the input signal $V_e$ is obtained by combining the error voltage signal $V_{err}$ and the feedback signal $V_{fb}$ (i.e. $V_e = V_{err} + V_{fb}$). However, this is for illustrative purposes only, and is not meant to be a limitation of the present invention. In another embodiment, the input signal $V_e$ may be directly set by the error voltage signal $V_{err}$ (i.e. $V_e = V_{err}$). To put it simply, the generation of the input signal $V_e$ of the filter circuit 122 also depends on the controller architecture or implementation.

Regarding the hold decision maker circuit 124, it is arranged to generate a plurality of control signals SC1 and SC2, output the control signal SC1 to the filter circuit 122, and output the control signal SC2 to the loop filter circuit 114. After receiving the control signal SC1, the filter circuit 122 is instructed by the hold decision maker circuit 124 to hold or permit integration of the input signal $V_e$. After receiving the control signal SC2, the loop filter circuit 104 is instructed by the hold decision maker circuit 124 to enable or disable generation of the feedback signal $V_{fb}$ at the loop filter circuit 114. For example, in response to the control signal SC1 with one setting (e.g. SC1=1), the controller circuit 102 (particularly, filter circuit 122 of controller circuit 102) temporarily holds integration of the input signal $V_e$; in response to the control signal SC1 with another setting (e.g. SC1=0), the controller circuit 102 (particularly, filter circuit 122 of controller circuit 102) does not temporarily hold integration of the input signal $V_e$; in response to the control signal SC2 with one setting (e.g. SC2=1), the feedback loop circuit 102 (particularly, loop filter circuit 114 of feedback loop circuit 102) generates and outputs the feedback signal $V_{fb}$ to the controller circuit 102 for regulating the output voltage signal $V_o$ during a period in which the controller circuit 102 (particularly, filter circuit 122 of controller circuit 102) temporarily holds integration of the input signal $V_e$; and in response to the control signal SC2 with another setting (e.g. SC2=0), the feedback loop circuit 104 (particularly, loop filter circuit 114 of feedback loop circuit 102) does not generate and output the feedback signal $V_{fb}$ to the controller circuit 102 for regulating the output voltage signal $V_o$ during a period in which the controller circuit 102 (particularly, filter circuit 122 of controller circuit 102) does not temporarily hold integration of the input signal $V_e$.

The hold decision maker circuit 124 can enable the feedback loop circuit 104 to output the feedback signal $V_{fb}$ to the controller circuit 102 during a period in which the voltage regulator 100 operates under DCM. In addition, the hold decision maker circuit 124 can disable the feedback loop circuit 104 when it is not needed, for example, in a continuous conduction mode (CCM).

As mentioned above, the integration of the input signal $V_e$ is on hold for improving the load transient response, and the proposed feedback signal $V_{fb}$ is used to compensate for the regulator output voltage inaccuracy. However, compared to integration of the input signal $V_e$, the feedback signal $V_{fb}$ derived from middle point voltage extraction does not reflect the instant deviation of the regulator output voltage. Thus, there is a need for properly determining an optimized integration on-hold period for each switching DCM cycle, to achieve optimized output voltage regulation performance (e.g. fast load transient response and high regulator output voltage accuracy). The hold decision maker circuit 124 is used to determine when to hold the compensation (particularly, integration of input signal $V_e$) temporarily. In this embodiment, the hold decision maker circuit 124 is arranged to check a plurality of parameters (e.g. VERR, DCM, Trig, and ZX) to make a hold decision. Since multiple parameters are jointly considered, a more accurate hold decision can be made to set an optimized integration on-hold period.

The parameter VERR indicates the polarity of the error voltage signal $V_{err}$. If the error voltage signal $V_{err}$ is in the negative region, the integration of the input signal $V_e$ is allowed to be held. If the error voltage signal $V_{err}$ is in the positive region, there is no need to hold the integration of the input signal $V_e$.

The parameter DCM indicates whether the voltage regulator 100 operates under DCM. If the voltage regulator 100 operates under DCM, the integration of the input signal $V_e$ is allowed to be held. If the voltage regulator 100 operates under CCM, there is no need to hold the integration of the input signal $V_e$.

The parameter ZX indicates whether zero current crossing of the inductor current $I_L$ of the voltage regulator 100 happens. If zero current crossing of the inductor current $I_L$ happens, it implies that the voltage regulator 100 operates under DCM, and the integration of the input signal $V_e$ is allowed to be held. The parameter Trig indicates whether triggering of PWM pulse happens. If triggering of PWM pulse happens, there is no need to hold the integration of the input signal $V_e$. For example, the integration on-hold period may start at the time zero current crossing of the inductor current $I_L$ happens, and may end at the time triggering of PWM pulse happens.

Figure 7:
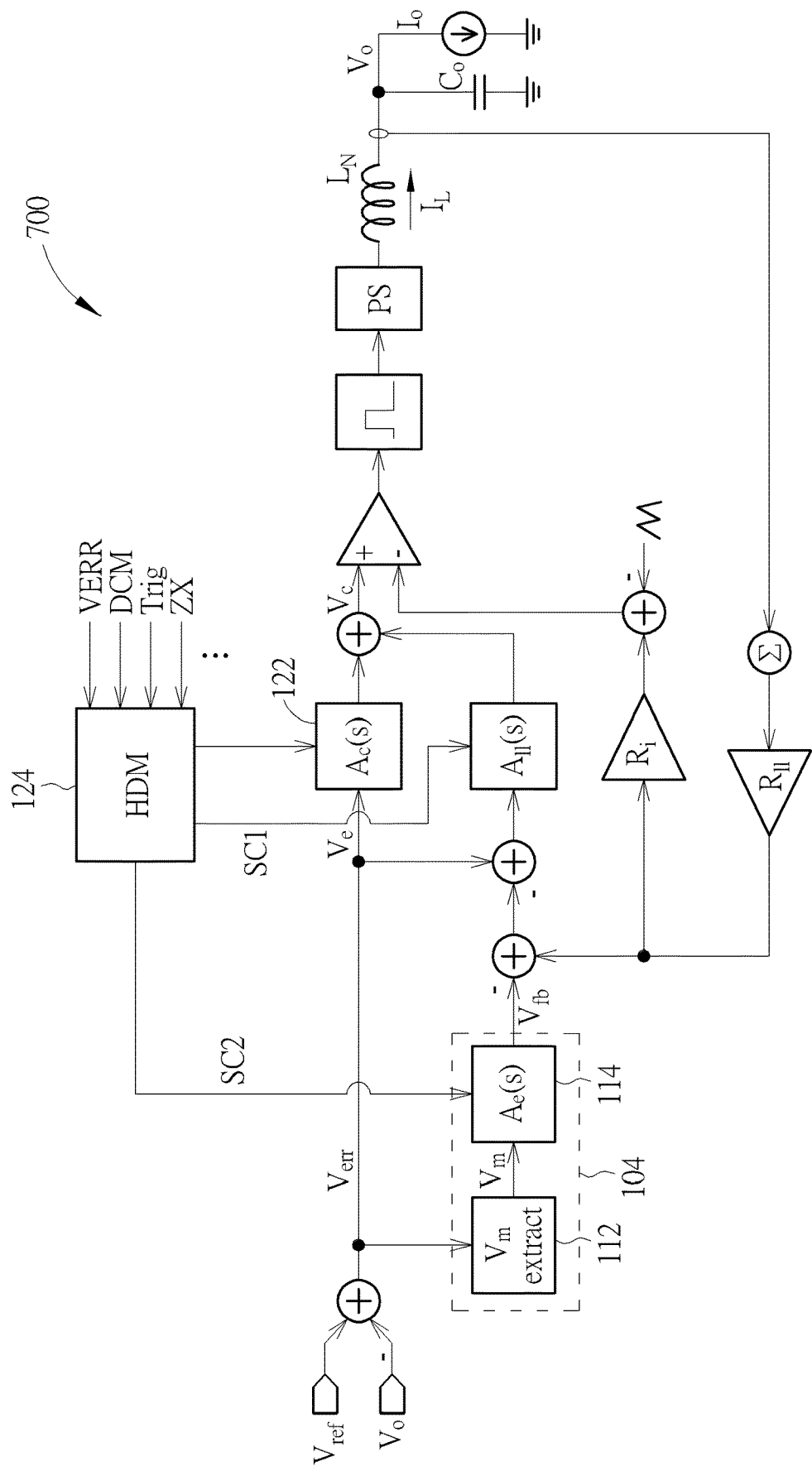
FIG. 7 is a diagram illustrating a second voltage regulator according to an embodiment of the present invention.
Figure 8:
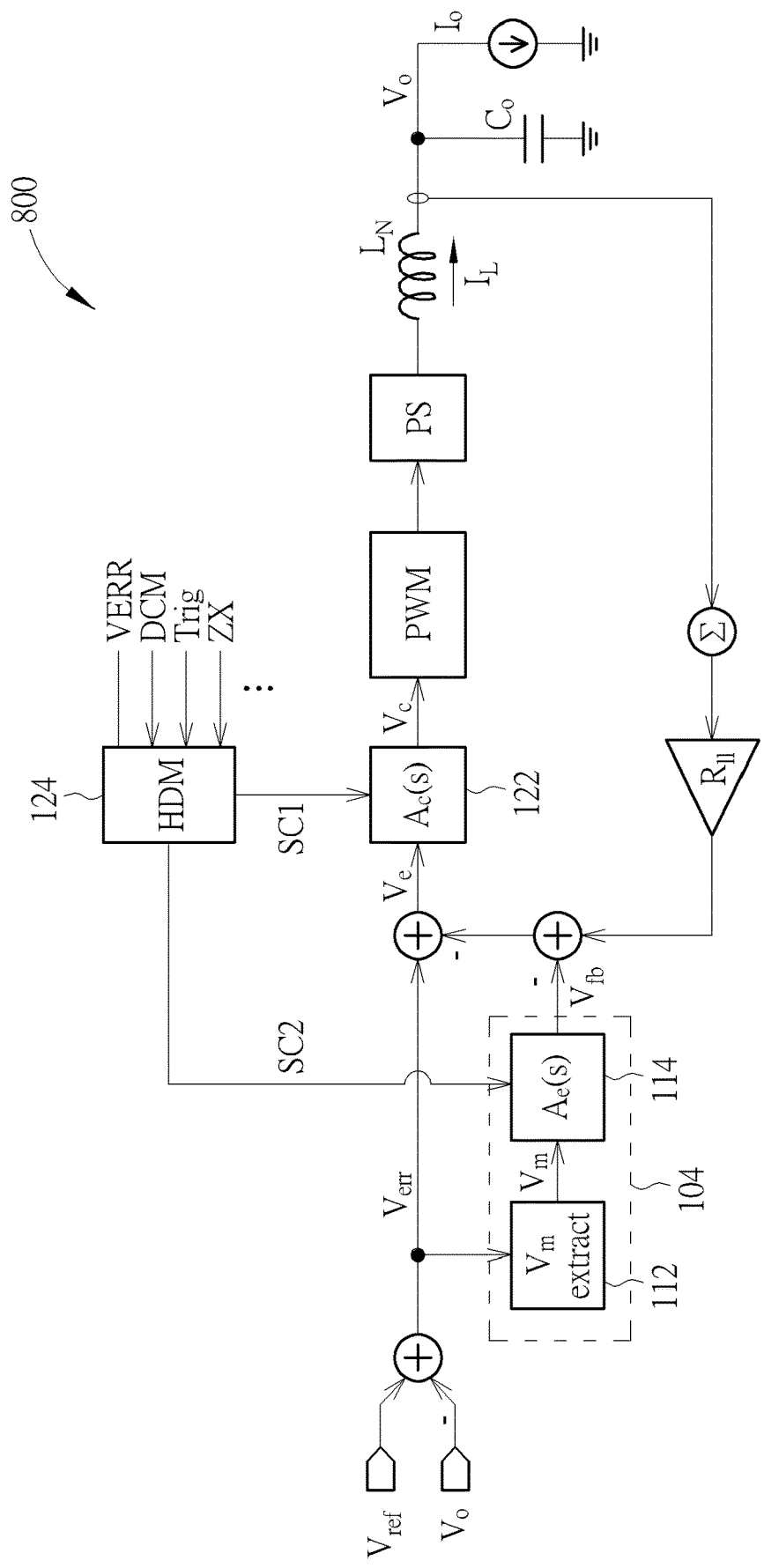
FIG. 8 is a diagram illustrating a third voltage regulator according to an embodiment of the present invention.
Figure 9:
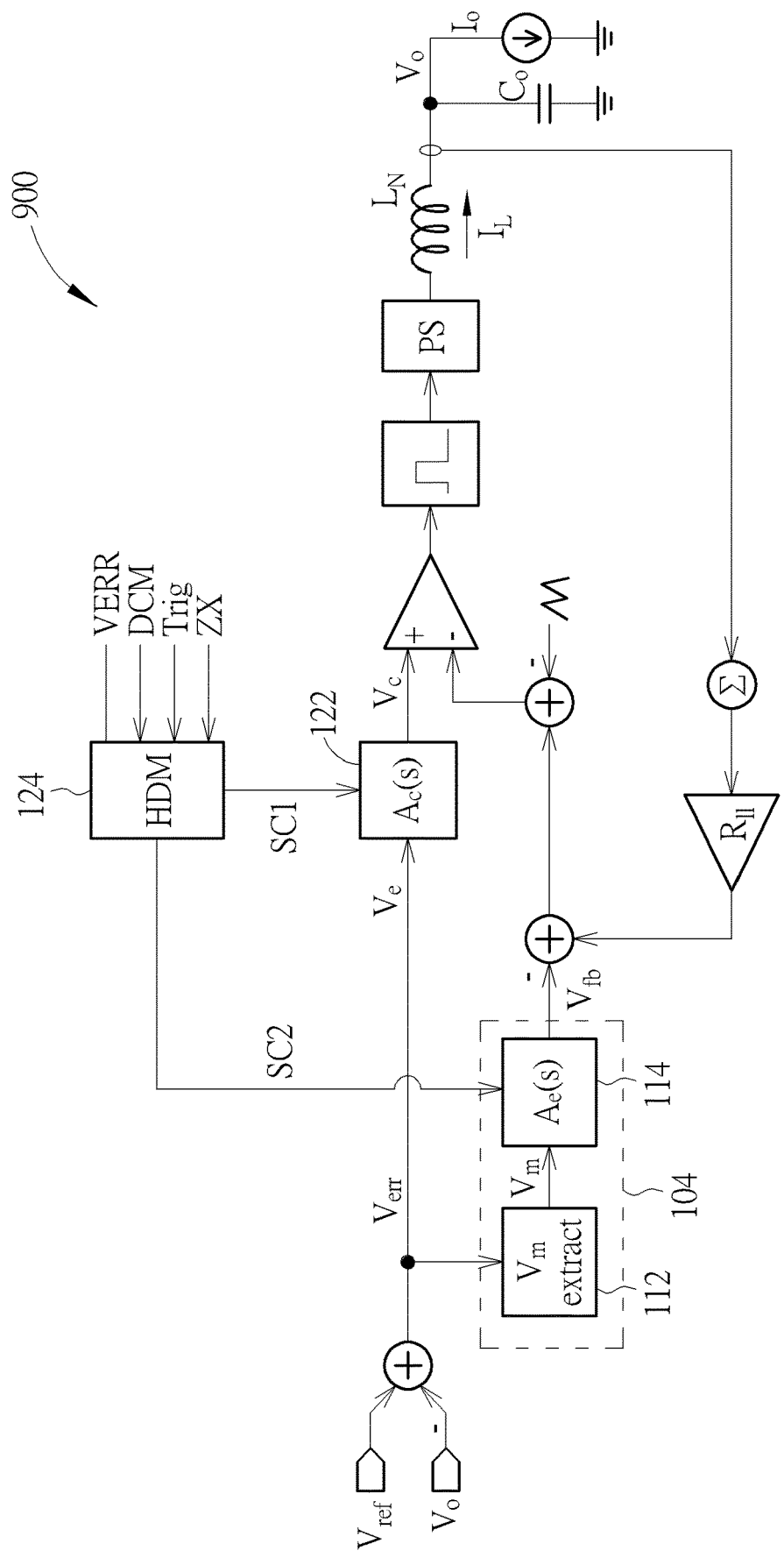
FIG. 9 is a diagram illustrating a fourth voltage regulator according to an embodiment of the present invention.

The controller architecture shown in FIG. 1 is for illustrative purposes only, and is not meant to be a limitation of the present invention. In practice, the proposed feedback loop circuit 104 and hold decision maker circuit 124 can be employed by any switching voltage regulator that supports DCM operation. FIG. 7, FIG. 8 and FIG. 9 are diagrams illustrating other voltage regulators 700, 800, 900, each having the proposed feedback loop circuit 104 and hold decision maker circuit 124. For example, the proposed feedback loop circuit 104 and hold decision maker circuit 124 can be employed by a voltage regulator using PWM control with loadline/AVP (adaptive voltage positioning). For another example, the proposed feedback loop circuit 104 and hold decision maker circuit 124 can be employed by a voltage regulator using PWM control with current-mode fixed frequency/COT (constant-on-time).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A feedback loop circuit of a voltage regulator comprising:
    a voltage extraction circuit, arranged to receive an error voltage signal that is indicative of difference between an output voltage signal and a reference voltage of the voltage regulator, and generate a voltage extraction signal by extracting one representative voltage for one switching cycle of the voltage regulator according to the error voltage signal; and
    a loop filter circuit, arranged to apply filtering to the voltage extraction signal to set a feedback signal, and output the feedback signal to a controller circuit of the voltage regulator for regulating the output voltage signal.

2. The feedback loop circuit of claim 1, wherein during said one switching cycle of the voltage regulator, the voltage extraction circuit is arranged to sample a peak voltage and a valley voltage of the error voltage signal, and determine said one representative voltage according to the peak voltage and the valley voltage.

3. The feedback loop circuit of claim 2, wherein said one representative voltage is a middle point voltage between the peak voltage and the valley voltage.

4. The feedback loop circuit of claim 1, wherein the feedback loop circuit is arranged to output the feedback signal to the controller circuit during a period in which the voltage regulator operates under a discontinuous conduction mode (DCM).

5. The feedback loop circuit of claim 1, wherein the feedback loop circuit is arranged to output the feedback signal to the controller circuit during a period in which the controller circuit temporarily holds integration of an input signal that is derived from the error voltage signal.

6. A controller circuit of a voltage regulator comprising:
    a filter circuit, arranged to receive an input signal, and perform integration of the input signal to set a filter output signal, wherein the input signal is derived from an error voltage signal that is indicative of difference between an output voltage signal and a reference voltage of the voltage regulator, and the filter output signal is used for pulse-width modulation (PWM) control of the voltage regulator; and
    a hold decision maker circuit, arranged to check a plurality of parameters to make a hold decision for instructing the filter circuit to temporarily hold the integration of the input signal.

7. The controller circuit of claim 6, wherein the plurality of parameters comprise a parameter that indicates polarity of the error voltage signal.

8. The controller circuit of claim 6, wherein the plurality of parameters comprise a parameter that indicates whether the voltage regulator operates under a discontinuous conduction mode (DCM).

9. The controller circuit of claim 6, wherein the plurality of parameters comprise a parameter that indicates whether zero current crossing of an inductor current of the voltage regulator happens.

10. The controller circuit of claim 6, wherein the plurality of parameters comprise a parameter that indicates whether triggering of PWM pulse happens.

11. A voltage regulator comprising:
    a controller circuit, comprising:
        a filter circuit, arranged to receive an input signal, and perform integration of the input signal to set a filter output signal, wherein the input signal is derived from an error voltage signal that is indicative of difference between an output voltage signal and a reference voltage of the voltage regulator, and the filter output signal is used for pulse-width modulation (PWM) control of the voltage regulator; and
        a hold decision maker circuit, arranged to generate a first control signal and a second control signal; and a feedback loop circuit, arranged to receive the error voltage signal, and generate a feedback signal according to the error voltage signal;

wherein in response to the first control signal with a first setting, the controller circuit temporarily holds the integration of the input signal; and in response to the second control signal with a second setting, the feedback loop circuit generates and outputs the feedback signal to the controller circuit for regulating the output voltage signal during a period in which the controller circuit temporarily holds the integration of the input signal.

12. The voltage regulator of claim 11, wherein in response to the first control signal with a third setting, the controller circuit does not temporarily hold the integration of the input signal; and in response to the second control signal with a fourth setting, the feedback loop circuit does not generate and output the feedback signal to the controller circuit during a period in which the controller circuit does not temporarily hold the integration of the input signal.

13. The voltage regulator of claim 11, wherein the feedback loop circuit comprises:
   a voltage extraction circuit, arranged to generate a voltage extraction signal by extracting one representative voltage for one switching cycle of the voltage regulator according to the error voltage signal; and
   a loop filter circuit, arranged to apply filtering to the voltage extraction signal to set the feedback signal.

14. The voltage regulator of claim 13, wherein during said one switching cycle of the voltage regulator, the voltage extraction circuit is arranged to sample a peak voltage and a valley voltage of the error voltage signal, and determine said one representative voltage according to the peak voltage and the valley voltage.

15. The voltage regulator of claim 14, wherein said one representative voltage is a middle point voltage between the peak voltage and the valley voltage.

16. The voltage regulator of claim 11, wherein the hold decision maker circuit is arranged to check a plurality of parameters to set the first control signal.

17. The voltage regulator of claim 16, wherein the plurality of parameters comprise a parameter that indicates polarity of the error voltage signal.

18. The voltage regulator of claim 16, wherein the plurality of parameters comprise a parameter that indicates whether the voltage regulator operates under a discontinuous conduction mode (DCM).

19. The voltage regulator of claim 16, wherein the plurality of parameters comprise a parameter that indicates whether zero current crossing of an inductor current of the voltage regulator happens.

20. The voltage regulator of claim 16, wherein the plurality of parameters comprise a parameter that indicates whether triggering of PWM pulse happens.

* * * * *